Figure 1:
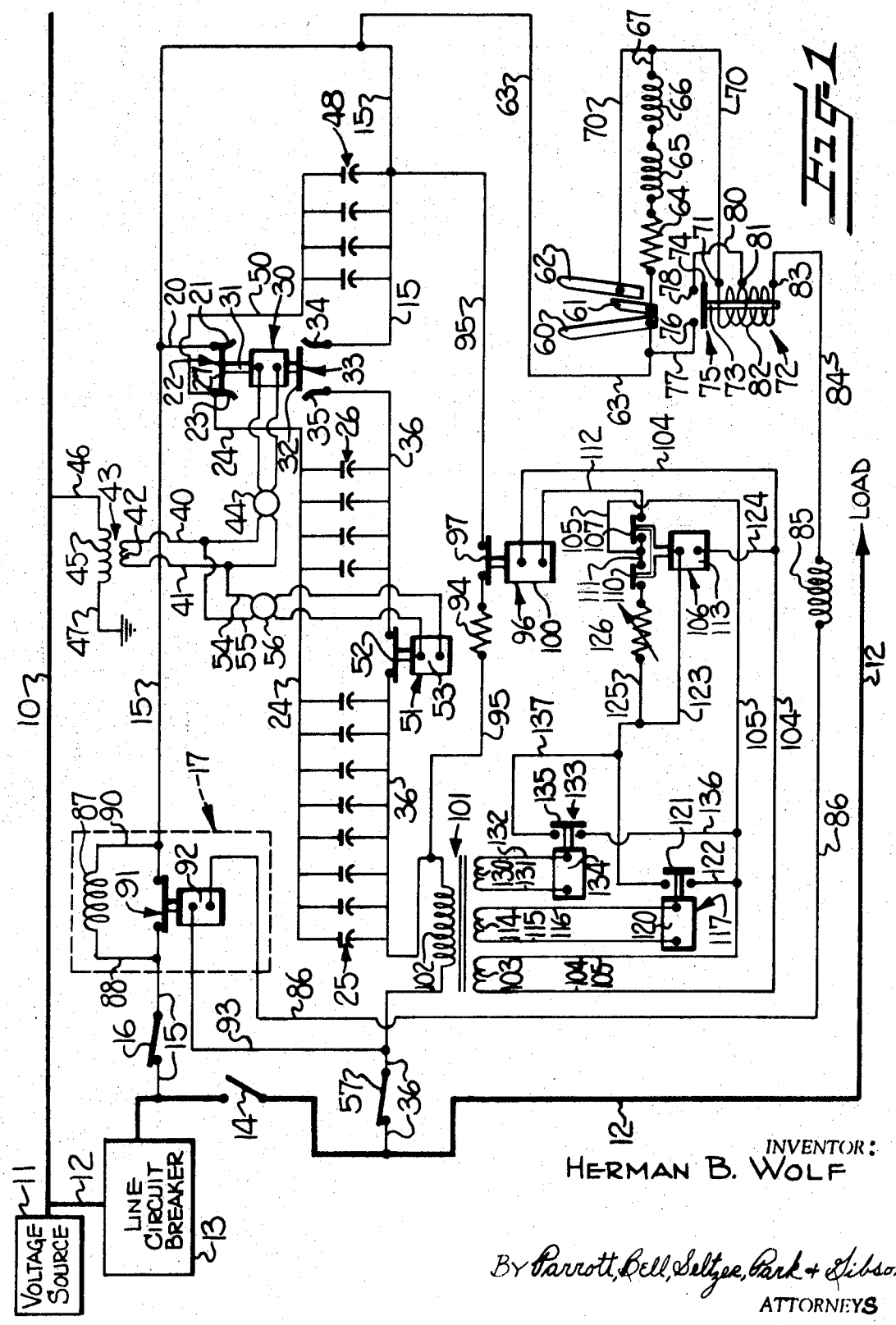

United States Patent

[11] 3,573,549

| [72] | Inventor | Herman B. Wolf<br>Charlotte, N.C. |
| --- | --- | --- |
| [21] | Appl. No. | 823,470 |
| [22] | Filed | May 9, 1969<br>Continuation-in-part of Ser. No. 508,974,<br>Nov. 22, 1965, Pat. No. 3,457,459. |
| [45] | Patented | Apr. 6, 1971 |
| [73] | Assignee | R. H. Bouligny, Inc.<br>Charlotte, N.C. |

[54] ELECTRICAL SYSTEM INCLUDING CAPACITORS
3 Claims, 2 Drawing Figs.

[52] U.S. Cl. .................................................. 317/12,
317/20, 317/53
[51] Int. Cl. ................................................... H02h 7/16
[50] Field of Search .................................... 317/12,
12.1, 20, 53

[56] References Cited
UNITED STATES PATENTS
2,571,910 10/1951 Marbury et al. .............. 317/12

*Primary Examiner*—James D. Trammell
*Attorney*—Parrott, Bell, Seltzer, Park & Gibson ABSTRACT: An alternating current electrical circuit having a bank of capacitors connected therein and in which the voltage appearing on the circuit is varied by varying interconnection of capacitors and the possible appearance of resonance effects is controlled by interconnection of a resistor with the capacitors.

Patented April 6, 1971

3,573,549

2 Sheets-Sheet 1

INVENTOR:
HERMAN B. WOLF

By Parrott, Bell, Seltzer, Park & Gibson
ATTORNEYS

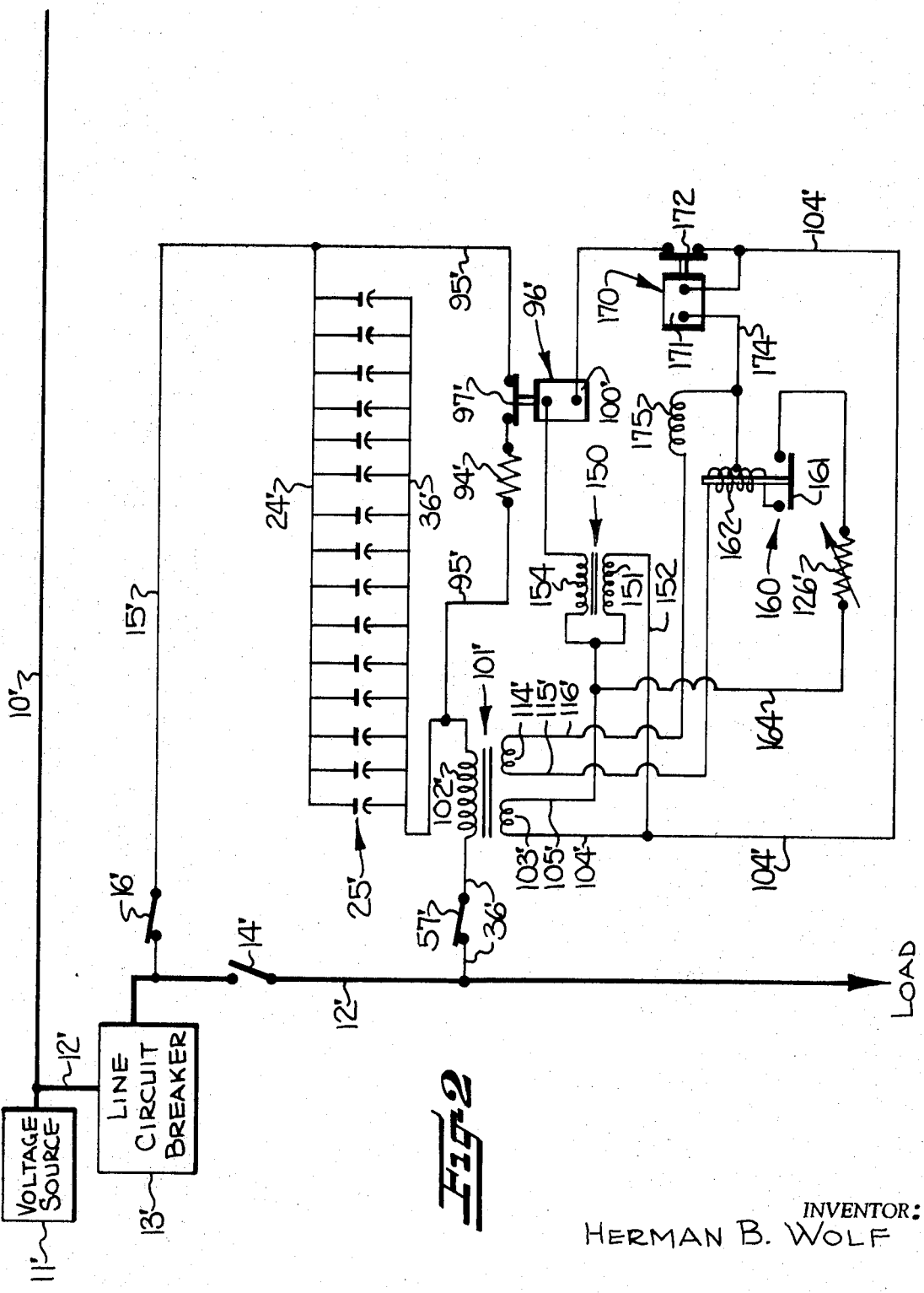

ELECTRICAL SYSTEM INCLUDING CAPACITORS

This application is a continuation-in-part of a copending application filed Nov. 22, 1965 under Ser. No. 508,974 entitled ELECTRICAL SYSTEM INCLUDING CAPACITORS now U.S. Pat. No. 3,457,459 issued Jul. 22, 1969.

The present invention relates to an alternating current electrical system or circuit and more particularly to such an electrical system or circuit which includes a bank of capacitors.

An electrical circuit which has a bank of capacitors, within which the capacitors are connected in parallel to each other, connected in series with a load is quite common and such capacitors are commonly referred to in the trade as "series capacitors." Such capacitors comprise a facility which, within the limitations of current flow in the circuit and capacitor bank capacity, provides a voltage boost to the circuit and at the same time contributes to the reactive component of power in the circuit. The voltage output of such a capacitor bank (hereinafter referred to as "boost voltage") is proportional to the current and any KVAR Kilo-Volt Ampere Reactive Power Component) generated in the capacitor bank as a result of current flow in excess of the circuit requirement will be supplied to the system to which the circuit is connected.

Frequently, the voltage supplied from a voltage source to a circuit or system (hereinafter referred to as "applied voltage") will vary from the desired normal applied voltage and the load connected thereto will also vary considerably from very light load- to-peak load conditions. Since the bank of capacitors is coordinated with the normal applied voltage and the normal load connected to the circuit with a suitable safety factor, variances in applied voltage will adversely affect the condition of the circuit and equipment connected thereto and will frequently result in damage to the circuit and/or equipment connected thereto.

In a distribution circuit, for example, if the applied voltage rises appreciably above the predetermined normal voltage, this increased applied voltage plus the normal boost voltage being supplied by the bank of capacitors will result in excess voltage being supplied to customers and particularly those customers who are relatively close to the substation from which the distribution circuit emanates. This over voltage may and will frequently exceed the voltage rating of electrical equipment connected to the circuit and will result in damage to this equipment, such as burned-out lightbulbs and other equipment failures. Conversely, if the applied voltage on a distribution circuit, for example, drops below the predetermined normal applied voltage, and particularly if this voltage drop occurs during periods of peak load, the boost voltage being supplied by the bank of capacitors will also decrease and there will not be sufficient voltage on the circuit to supply the power necessary to properly operate the equipment connected thereto.

It is, therefore, an object of the present invention to provide an electrical circuit or system wherein the capacitance in the circuit is increased or decreased in response to changes in the applied voltage for controlling the voltage on the circuit to maintain this voltage substantially uniform irrespective of variances in the applied voltage. This object of the present invention is accomplished by providing a second bank of capacitors connected in parallel to and properly correlated with the first bank of capacitors and by adding this second bank of capacitors to the circuit or removing the same therefrom in response to changes in the applied voltage to decrease the boost voltage being supplied to the circuit in the event of a rise in the applied voltage or to increase the boost voltage and KVAR being supplied to the circuit in the event of a drop in the applied voltage.

In addition to the more or less normal variances in voltage discussed above, an emergency situation will sometimes occur wherein the applied voltage will drop to a very low value. When this occurs, the applied voltage and boost voltage are at such a low value that the equipment connected to the circuit cannot be operated and frequently damage to the circuit and/or equipment will result.

Accordingly, a more specific object of the present invention is to provide an emergency voltage boost and KVAR supply on a circuit when the applied voltage drops to a point indicating an emergency situation. This object is accomplished in a distribution circuit as described above, for example, by a third bank of capacitors which is connected in parallel with the second bank of capacitors. In response to a first predetermined voltage drop, the second bank of capacitors is removed from the circuit, and in response to a further second predetermined voltage drop, the second and third banks are connected in parallel to each other and are connected in series with the first bank of capacitors thereby substantially decreasing the capacitance in the circuit and thereby substantially increasing the boost voltage and supplying a large block of KVAR to the circuit.

It is further well known that circuits including capacitors therein are occasionally subject to resonance, such as ferroresonance and subsynchronous resonance. Ferroresonance may occur at the instant when the circuit which includes an iron core reactance, such as an unloaded or lightly loaded transformer, is energized, and subsynchronous resonance may occur when the circuit includes a large motor which is subject to being started when the circuit is otherwise unloaded or lightly loaded. A definite relationship must exist between the capacitance and reactance before ferroresonance will occur, and, in addition, the instant of closing or completion of the circuit must be at a definite portion of the 60-cycle wave.

Accordingly, another object of the present invention is to provide a capacitor circuit wherein ferroresonance, subsynchronous resonance or both are suppressed until all likelihood of the same occurring has passed and wherein normal operation of the circuit is not adversely affected thereafter.

Some of the objects of the invention having been stated, other objects will appear as the description proceeds when taken in connection with the accompanying drawings, in which:

FIG. 1 is a schematic view of a first electrical system or circuit incorporating the features or the present invention; and FIG. 2 is a schematic view of a second electrical system or circuit incorporating alternates for accomplishing certain of the functions of the circuit of FIG. 1.

Referring now more specifically to the drawings, there is shown therein all features of the present invention connected in a circuit (FIG. 1), such as a distribution circuit but which in certain instances may be a transmission circuit or any other desired circuit. In all instances, a bus line 10 or the like is connected to an alternating current voltage source 11 which normally supplies a predetermined applied voltage thereto and may be a station bus, a transmission line or a portion of a system or network. Bus line 10 may be single phase, two phase or three phase as required, with a single phase having been shown, but it being understood that if a multiphase circuit is used, bus line 10 represents one phase thereof and the other phases will be substantially as shown.

A distribution line 12 or the like is connected to bus line 10 at one end and is connected to a suitable load which may be of any desired character. Line 12 has a line circuit breaker 13 connected therein which is of conventional construction, and also has a normally open, manually operable switch 14 connected therein.

CAPACITOR CIRCUIT

A circuit will now be described with reference to FIG. 1 for connecting capacitors into the line 12 between the bus line 10 and the load. This circuit includes a line 15 which is connected at one end to line 12 between the line circuit breaker 13 and the manually operable switch 14. Line 15 has a normally closed, manually operable switch 16 connected therein and if the line 12 is a transmission line normally having an applied voltage exceeding a predetermined value, e.g., 35,000 volts, line 15 will preferably have connected therein a fault current limiting device, broadly indicated at 17, to be described in detail hereinafter.

A line 20 is connected at one end to line 15 and at its other end to one stationary contact 21 of a normally closed switch 22. The other stationary contact 23 of switch 22 has one end of a line 24 connected thereto, the remainder of which is connected to one side of first and second banks of capacitors 25 and 26, respectively. The movable contact 27 of switch 22 is moved between open and closed position by an actuator means 30, which is illustrated in the drawing as a solenoid having its plunger 31 connected at one end to the movable contact 27. The other end of the plunger 31 is connected to a movable contact 32 of a normally open switch 33, one stationary contact 34 of which has the other end of line 15 connected thereto. The other stationary contact 35 of switch 33 has one end of a line 36 connected thereto. Line 36 is connected to the other side of first and second banks of capacitors 25, 26 and to line 12 on the opposite side of switch 14 from line 15.

Switches 22 and 33 are of the transfer type which means that switch 33 is closed before switch 22 is opened and vice versa. Switches 22 and 33 and actuator means 30 therefor combine to form a selector switch assembly for controlling the capacitance in the capacitor circuit in a manner to be presently described. In this respect, the coil of solenoid 30 is connected by lines 40, 41 to the secondary winding 42 of a voltage transformer 43 through the contacts of a voltage controlled relay 44.

Voltage transformer 43 has one side of the primary winding 45 thereof connected to bus line 10 by a line 46 and the other side thereof connected to neutral and ground by a line 47. Therefore, voltage transformer 43 has the applied voltage carried by bus line 10 impressed thereon and the voltage controlled relay 44 is set to be actuated when the voltage impressed on secondary winding 42 is above a predetermined value which occurs when the applied voltage is above a predetermined value. Therefore, solenoid 30 is energized when the applied voltage is above the predetermined valve, but if the applied voltage falls below this value, the relay 44 will be deactivated and solenoid 30 will be deenergized and will open switch 22 and close switch 33.

A third bank of capacitors 48 has one side thereof connected to line 15 and has a line 50 connected to the other side thereof which is also connected to contact 23 of switch 22. Therefore, with switch 22 closed and switch 33 open, the third bank of capacitors 48 is not connected in the capacitor circuit and has no effect thereon. However, when switch 22 is opened and switch 33 is closed in response to a drop in the applied voltage, the third bank of capacitors 47 is connected in parallel to the second bank of capacitors 26.

Normally closed contactor means 51 is interposed in line 36 between the first and second bank of capacitors 25 and 26 and includes a switch 52 and an actuator means connected thereto which is shown as a solenoid 53. Solenoid 53 has the coil thereof connected by lines 54,55 to lines 40,41 respectively between secondary winding 42 and voltage controlled relay 44 and through a second voltage controlled relay 56. It is noted that second voltage controlled relay 56 is set to be actuated when a higher voltage is impressed on secondary winding 42 than first voltage controlled relay 44, which higher voltage is a predetermined amount less than the normal voltage impressed thereon when the normal applied voltage is being carried by bus line 10.

A normally closed, manually operable switch 57 is connected in line 36 adjacent its connection to line 12 to permit manual control of the capacitor circuit.

The operation of the capacitor circuit will now be described, and in such operation, switch 14 is normally open and switches 16 and 57 are normally closed so that the capacitor circuit is connected in series in line 12. Under normal applied voltage conditions, both voltage controlled relays 44 and 56 will be actuated and solenoids 30 and 53 will be energized and switches 22 and 52 will be closed and switch 33 will be open. First and second banks of capacitors 25 and 26 are, therefore, connected in parallel to each other and will function as a single bank of capacitors to supply boost voltage and KVAR to line 12.

Upon a first predetermined drop in the applied voltage, a voltage controlled relay 56 will be deactuated and solenoid 53 will be deenergized and switch 52 will be opened. This will remove the second bank of capacitors 26 from the capacitor circuit which will decrease the capacitance therein and will result in increased boost voltage and KVAR being supplied to line 12 by the remaining first bank of capacitors 25.

Upon a second predetermined or major drop in the applied voltage which is below the first predetermined drop, indicating an emergency condition, voltage controlled relay 44 will be deactuated and solenoid 30 will be deenergized which will open switch 22 and close switch 33, it being again noted that switch 33 will be closed before switch 22 is opened. This will connect the third bank of capacitors 48 in parallel with the second bank of capacitors 26 and, since switch 52 is open, the second and third banks of capacitors 26 and 48 will be connected in series with the first bank of capacitors 25. Accordingly, the capacitance of the capacitor circuit will be greatly decreased, e.g., as illustrated in the drawing, the capacitance would be halved and the boost voltage and KVAR being supplied to line 12 and bus line 10 will be greatly increased or doubled as illustrated in the drawing.

Of course, the third bank of capacitors 48 may and will frequently not be required and in such cases will be omitted along with the selector switch assembly. Also, there will be frequent instances when the second bank of capacitors 26 will not be required to be connected in the capacitor circuit under normal applied voltage conditions. In such cases, the voltage controlled relay 56 will be preset to be actuated upon a predetermined rise in the applied voltage and the second bank of capacitors 26 will be used to provide voltage control in line 12.

PROTECTING DEVICE FOR CAPACITOR CIRCUIT

Capacitor circuits are known to be susceptible to damage in the event of a fault occurring therein and, therefore, the illustrated circuitry (FIG. 1) provides means for protecting against fault current damage. The means provided is fully described and discussed in the aforementioned application of which the present application is a continuation-in-part, and thus will not be dwelt upon here. However, it is noted that the protective means includes an arc gap defined by a plurality of electrodes 60,61,62 and coils, resistors, contactors and conductors operatively associated therewith for normally maintaining a high resistance circuit path in parallel with the capacitors and for shunting the capacitors under fault current conditions. For a more complete understanding, reference is made to the aforementioned application.

RESONANCE SUPPRESSOR

In accordance with this invention, a resonance suppressor is connected in the capacitor circuit (FIG. 1) for suppressing either ferroresonance or subsynchronous resonance or both. This suppressor includes a resistor 94 connected in shunting relation to the capacitors by a line 95 which in turn is connected at its opposite ends to line 15 and 36, respectively. A contactor means 96 controls the connection of resistor 94 in the capacitor circuit to thereby control its resonance suppressing action and includes a normally closed switch 97 connected in line 95 in series with the resistor 94. Contactor means 96 also includes an actuator means 100 for opening and closing switch 97 and this actuator means is illustrated as being a solenoid.

Contactor means 96 is energized in such a manner that resistor 94 remains connected across the capacitors until all likelihood of resonance occurring has passed. To effect and control the energization of contactor means 96, there is provided a current transformer 101 which has the primary winding 102 thereof connected in line 36 in series with the capacitors. Current transformer 101 is of the iron core type and includes a first secondary winding 103, one side of which is connected by a line 104 to one side of solenoid 100. The other side of secondary winding 103 is connected by a line 105 to a special seal-in relay broadly indicated at 106. Seal-in relay 106 includes normally open, first and second switches 107 and 110 connected in series by a bridge line or bar 111 and line 105 is connected to this bridge line 111. The other side of switch 107 is connected by a line 112 to the opposite side of solenoid 100 from line 104 to complete a circuit thereto when switch 107 is closed.

Switches 107 and 110 have a common actuator means 113 which is illustrated as a solenoid. The solenoid 113 may be energized in either one of two manners depending upon the type of resonance desired to be suppressed by the resistor 94. In this respect, current transformer 101 includes a secondary winding 114, opposite sides of which are connected by lines 115,116 to a relay contactor means 117. Relay contactor means 117 includes an actuator means 120, illustrated as a solenoid, to which the lines 115 and 116 are connected and also includes a normally open switch 121. Switch 121 has one side thereof connected by a line 122 to the line 105 and the other side thereof connected by a line 123 to one side of solenoid 113, the other side of which is connected to line 104 by a line 124. This completes a first energizing circuit to the seal-in control relay 106. A holding or seal-in circuit is provided to solenoid 113 by a line 125 which connects switch 110 to line 123. A variable resistor 126 is connected in line 125 to vary the current value at which solenoid 113 will become deenergized and thereby vary the dropout point.

Since ferroresonance only occurs when an iron core reactance is connected in an unloaded or very lightly loaded circuit and only when the circuit is energized at a particular portion of the 60-cycle wave, such ferroresonance will be completely eliminated form the circuit if resistor 94 is connected in shunting relation to the capacitors when the circuit is energized and is maintained in such shunting relation until the load reaches a predetermined value. The normally closed switch 97 of contactor means 96 assures that resistor 94 will be connected in shunting relation to the capacitors when the capacitor circuit is energized. Also, actuator means 120 of relay contactor means 117 is selected or preset to be energized only when the current flowing in the capacitor circuit reaches a value which would indicate that there is sufficient load on the circuit to prevent ferroresonance from occuring. This actuator means 120 is also of the type which will close switch 121 almost instantaneously, e.g., 15 cycles, after the current flowing in the line 115,116 reaches the predetermined value. Upon such closure of switch 121, current will flow from the secondary winding 103 through lines 104 and 124 to one side of solenoid 113 and through lines 105,122,123 and switch 121 to the other side of solenoid 113 to thereby energize the same and close switches 107 and 110. Upon closure of switch 107, current will flow through the line 104 to one side of solenoid 100 and through lines 105,111 and 112 and switch 107 to the other side thereof to energize the same and open switch 97 and remove the resistor 94 from the capacitor circuit. At the same time, current will flow through lines 104 and 124 to one side of solenoid 113 and through lines 105,111,125 and 123 and switch 110 to the other side thereof to maintain the same energized even if the switch 121 were to be opened.

Subsynchronous resonance can be completely eliminated from the capacitor circuit by maintaining resistor 94 in shunting relation to the capacitors until the motor, whose starting would cause the resonance, has sufficient time to reach normal operating speed and thereafter until the load current flowing in the circuit reaches sufficient value such that this resonance may not occur. To accomplish this, transformer 101 has a third secondary winding 130 which has opposite sides thereof connected by lines 131,132, to a special relay contactor means 133. Relay contactor means 133 includes an actuator means 134, illustrated as a solenoid, to which lines 131,132 are connected, and a normally open switch 135. Switch 135 has one side thereof connected by a line 136 to line 105 and the other side thereof connected by a line 137 to the line 123.

It is noted that relay contactor 133 should be selected or preset to be energized at a lower current than relay contactor means 117, which current is still sufficiently high to indicate that there is sufficient load on the circuit to prevent subsynchronous resonance from occurring. Also, relay contactor means 133 is specially constructed whereby a predetermined delay, e.g., several seconds, will elapse after energization thereof before the same operates to close switch 135. This predetermined delay should be sufficient for the motor to reach normal operating or running speed before switch 135 is closed and seal-in relay 106 is actuated to remove the resistor 94 from the capacitor circuit. It is noted that the current in the circuit required to start the motor will initially be quite high and will decrease as the speed of the motor increases. Initially upon starting of the motor, this starting current will probably exceed the current at which relay contactor means is energized but the time delay will prevent resistor 94 from being removed from the circuit until the motor reaches normal operating speed. If the motor comprises substantially all of the load on the circuit, the starting current may decrease as the motor speed increases to a point where the current in the circuit under normal operating speed conditions of the motor is below the current value at which relay contactor means 133 is energized and the circuit would then be subject to subsynchronous resonance occurring if another motor was started thereon. However, if the current does decrease in this manner, relay contactor means 135 will be deenergized before the time delay has expired and resistor 94 will remain in the circuit until the current again exceeds the predetermined value and remains in excess thereof for the time delay period.

While the discussion of resonance suppression to this point has been directed particularly to the means incorporated for that function in the capacitor circuit of FIG. 1, it is contemplated by the present invention that other forms may be taken by the means responsive to a predetermined current flow in the capacitor circuit for actuating a contactor means to remove a resonance suppressing resistor after there is no further likelihood for resonance occurring. In particularly an alternative to this portion of the circuit arrangement of FIG. 1 is shown schematically in FIG. 2 and will now be described. For purposes of ready comparison of the structure shown in FIG. 1 and FIG. 2, a similar arrangement of components has been used and, where possible, common reference characters have been applied with the addition of prime notation in FIG. 2. In order to more particular point out the distinctions between the resonance suppression means in the two circuits, the capacitor bank switching arrangement and protecting device shown in FIG. 1 have been eliminated from the circuit of FIG. 2. It is to be understood, however, that the means illustrated in FIG. 2 for the suppression of resonance is equally applicable with the other circuit arrangements shown in FIG. 1.

Referring now more particularly to FIG. 2, a current transformer 101' is arranged for the flow of current in the primary 102' in a manner similar to that discussed above with reference to the suppression of resonance in the circuit arrangement of FIG. 1. A resonance suppression resistor 94' is connected with the bank of capacitors 25' by the action of a contactor 96', in response to energization of a coil 100' by currents induced in secondary windings 103' and 114' of the current transformer 101', as such currents flow through additional circuit components.

These additional circuit components include an autotransformer 150, one winding of which is connected, by means of a conductor 152, to the conductor 104' of the first secondary winding 103' of the current transformer 101' and is also connected to the conductor 105' thereof for excitation of the autotransformer 150 by current flowing in the first secondary. Another circuit element is an induction relay 160, having a contact member 161 moving in response to energization of an actuating winding 162, divided into two portions for purposes described more fully hereinafter. By means of a conductor 164, one stationary contact of the induction relay 160 is connected to the conductor 105' and the autotransformer 150, with a variable resistance 126' interposed in that circuit.

The additional circuit components further include an instantaneous attachment relay generally indicated at 170 and having a contact set interposed in the conductor 104' between the first secondary winding 103' of the current transformer 101' and the coil 100' of the resonance suppression contactor 96'. A coil 171 of the instantaneous attachment relay 170 controls movement of a switching member 172, thus controlling the flow of current through the conductor 104' to the winding 100' of the resonance suppressor contactor 96'. Current flows to the coil 171 from the conductor 104' and through a conductor 174 to a point of the coil 162 of the induction relay 160.

The conductor 174 is also connected with the second secondary winding 114' of the current transformer 101' through a small reactor 175 interposed in the conductor 116'.

In operation, the contactor 96' is normally closed on energization of the electrical circuit, to place the resonance suppression resistor 94' in shunting relation to the bank of capacitors 25'. On flow of current through the primary winding 102' of the current transformer 101', excitation current for the autotransformer 150 flows from the secondary winding 103' of the current transformer 101' through the winding 151 of the autotransformer. The second secondary winding 114' of the current transformer 101' gives rise to current flow through a portion of the winding of the induction relay 160, thereby causing the switching member 161 of that relay to move to the circuit closed position. Closing of these contacts completes a circuit so that voltage from the first secondary winding 103' of the current transformer 101' causes current to flow through the variable resistor 126' and the coil 171 of the instantaneous attachment relay 170 to the conductor 104', with the variable resistor 126' limiting the current in that circuit. By virtue of this circuit including a portion of the winding 162 for the induction relay 160, that relay is sealed closed. Current through the winding 171 of the instantaneous attachment relay causes the contacts of that relay to close, impressing voltage from the autotransformer 150 across the coil 100' of the contactor 96', opening the contacts of the contactor and removing the resonance suppressing resistor 94' from electrical connection with the bank of capacitors 25'.

As current through the capacitor circuit decreases, the current through the portions of the winding 162 of the induction 160 decreases, causing the contacts of that relay to open. This releases the contacts of the instantaneous attachment relay 170 to open, and results in the normally closed contact of the contactor 96' being closed to place the resistor 94' in shunting relation to the series capacitor bank. Variations in the resistance value of the variable resistor 126' result in adjustment of the current values at which the means placing the resistor 94' in shunting relation to the capacitor bank operates.

It is contemplated that the circuit hereindescribed with reference to FIG. 2 may additionally be adapted to the suppression of subsynchronous resonance where the operation of the induction relay 160 is coordinated in time to the starting time of a large motor.

It is believed apparent that the present invention provides a novel alternating current electrical capacitor circuit or system in which the capacitance is varied in response to variances in applied voltage to control the voltage being carried by the capacitor circuit and in which resonance is suppressed or eliminated.

In the drawing and specification, there have been set forth preferred embodiments of the invention and, although specific terms are employed, they are used in a generic and descriptive sense only and not for purposes of limitation.

I claim:

1. In an alternating current electrical circuit having a bank of capacitors connected therein and being subject to the occurrence of resonance therein, the combination of resonance suppressing means comprising:
    a. resistor directly connected in parallel to said bank of capacitors to normally impress a resistance thereacross for suppressing resonance in said circuit;
    b. normally closed contactor means connected in series with said resistor; and
    c. means operatively connected to said contactor means and responsive to a predetermined current flow in said bank of capacitors for actuating said contactor means to open the same to remove said resistor from said circuit after there is no further likelihood of resonance occurring in said circuit.

2. A circuit according to claim 1 wherein said circuit includes an iron core reactance whereby there is substantial danger of ferroresonance occurring in said circuit immediately following energization thereof, and wherein said means for actuating said contactor means (c) operates very quickly upon the current in said circuit reaching said predetermined value to quickly remove said resistor from said circuit when the danger of ferroresonance has passed.

3. A circuit according to claim 1 wherein said circuit includes a relatively large motor connected thereto which is subject to being started during periods when said circuit is otherwise lightly loaded so that there is substantial danger of subsynchronous resonance occurring in said circuit, and wherein said means (c) delays actuation of said contactor means and removal of said resistor for a time period sufficient for said motor to reach normal running condition and thereafter until the load current in the circuit exceeds said predetermined value.